United States Patent Office 3,130,035
Patented Apr. 21, 1964

3,130,035
METHOD FOR DEFOLIATING AND
DESICCATING COTTON
William H. Culver, Bryan, Tex., assignor to Pennsalt
Chemicals Corporation, Philadelphia, Pa., a corporation of Pennsylvania
No Drawing. Filed May 12, 1960, Ser. No. 28,515
12 Claims. (Cl. 71—2.2)

This invention relates to chemical treatment of crop-bearing plants to obtain leaf desiccation and defoliation preparatory to harvesting. More particularly it pertains to the desiccation and/or defoliation of cotton plants by means of a selected pentavalent arsenic compound.

This application is a continuation-in-part of Serial No. 599,682, filed July 24, 1956, now abandoned.

Chemical treatment of an economic plant to prepare it for the harvesting operation is a valuable process which results in a predetermined modification of the normal maturing cycle of the plant. The modification may consist of defoliation without killing of the plant or injury to its crop; or desiccation of a large portion of the plant's leaves without killing of the plant or injury to its crop; or a combination of leaf desiccation in part, defoliation in part, and desiccation of some structures associated with the crop, as an aid to harvesting, all without killing of the plant. My invention is particularly concerned with the last type of plant growth modification.

Leaf desiccation and/or plant defoliation are important to efficient and early harvesting of crops such as soybeans, nursery stock and cotton. Defoliation and/or leaf desiccation of cotton is particularly desirable when machine picking or stripping is used. Desiccation and defoliation of cotton reduces boll rot, hastens the opening of mature bolls, and is considered an aid to disease and insect control. Cotton plant leaf desiccation and defoliation, especially by use of chemicals, therefore has been the subject of considerable experimental work.

Chemical desiccation of the leaves and/or defoliation of a plant, without killing of the plant or injury to its crop, is clearly a different phenomenon than desiccating and killing the plant outright with a herbicide. In the process of desiccation resulting from a chemical applied externally to the leaves, the leaves dry from lack of ability to draw moisture and nourishment from the plant body. The leaves may then abscise at the stems and fall free of the plant, but the plant may go on living for a considerable period of time, even through its normal life cycle. On the other hand, in effective herbicidal treatment, the entire plant generally quickly enters into a degenerative process and is eventually completely killed to the roots with the leaves usually wilting and remaining firmly attached to the plant. Such treatment of a plant is generally unsuitable for efficient harvesting of its crop.

The rarity of chemicals with defoliant action, or with an appropriate type of leaf desiccation, is well recognized in agricultural science. Although many chemicals are known to have herbicidal properties, few have been found which are useful as defoliants. Experience has shown that a chemical which is herbicidal in action on a particular plant is not usually a defoliant for the same plant. However, a chemical which is defoliant may also be a herbicide, if used in amounts excessive for defoliation.

Development of successful defoliants has been a slow proceess. Prior to 1948 calcium cyanamide was the only commercially successful and available defoliant. Since 1948 only about a dozen new defoliants have been found and developed. These include, for example, monosodium cyanamide, ammonium thiocyanate, potassium cyanate, sodium chlorate-sodium pentaborate, sodium chlorate-magnesium chloride and 3,6-endoxohexahydrophthalic acid and its derivatives (U.S. 2,576,080; 2,576,081; and 2,576,082).

Also, despite the importance of leaf and husk desiccation as an aid to harvesting with or without defoliation, very few chemicals have been found and developed specifically for leaf desiccation purposes without killing of the plant or injury of the crop.

Arsenic compounds have found wide use as herbicides. Acid-arsenical sprays have been used for several decades to treat and kill many thousands of acres of morning-glory, Russian Knapweed, alkali mallow, and other perennial weeds in California and other Western states. The recommended spray (see, for example "Weed Control" by Robbins, Crafts and Raynor, McGraw-Hill Book Company, 1942, p. 219) must contain at least one-half percent arsenic trioxide by weight and 5 percent sulfuric acid. Lead arsenate has been used at the rate of 20 to 25 lbs. per 1000 sq. ft. to control crabgrass. Ibid. p. 403. Arsenic petoxide, which forms arsenic acid in aqueous solution, has been used in the proprietary herbicide Pentox (California Spray Chemical Corporation, Richmond, California) for killing weeds. Arsenic trichloride, formed by refluxing arsenic trioxide with concentrated hydrochloric acid, forms the poisonous principle in another proprietary herbicide, identified as K.M.G. Another trivalent arsenic compound, sodium arsenite, is the principal constituent of many other commercial weed killers. The trivalent form of arsenic has been used more commonly than the pentavalent form because of the greater toxicity of the trivalent form. When applied to cotton plants, sodium arsenite is known to kill and desiccate the plants, without either defoliation or such leaf desiccation as would be useful as a harvesting aid.

I have now unexpectedly found that the leaf desiccation and defoliation of cotton can be carried out with good commercial success and without killing the plant or injuring its crop. These results are obtained by treating nearly mature and mature cotton plants with a composition comprising a selected pentavalent arsenic compound which is applied to the plants, preferably in spray form, in substantially less than phytocidal concentration and at less than soil sterilizing amounts a short time before harvesting is to begin. The application is preferably made from at least two days to about two weeks before harvesting is to begin.

More particularly, I have found that arsenic acid or a material forming arsenic acid in the presence of water is a useful and effective leaf desiccant and defoliant for cotton plants when applied to the nearly mature and mature plants in the manner and in the range of concentrations described herein. By use of my method, the leaves of the plants are caused to dry rapidly and to fall off in appreciable numbers within 2 to 10 days while the plant itself continues to live for a period of time sufficient to permit nearly mature cotton bolls to mature and open for harvesting. Treatment of plants by the method and composition of my invention permits rapid stripping and harvesting of the bolls, particularly with mechanical cotton stripping machines. Green stain of the cotton lint is much less than normally experienced during similar harvesting operations when my desiccant-defoliant composition is not used.

In the practice of my invention, an aqueous solution of the selected pentavalent arsenic compound is sprayed on growing plants at a concentration substantially less than a conventional herbicidal concentration and in less than soil sterilizing quantities. Arsenic acid, $H_3AsO_4$, and arsenic pentoxide, $As_2O_5$, are the principal pentavalent arsenic compounds thus used. Also, I have found that the acid ammonium salts of arsenic acid, monohydrogen ammonium arsenate, $(NH_4)_2HAsO_4$, and dihydrogen ammonium arsenate, $NH_4H_2AsO_4$, are equally as effective as arsenic acid for practicing my invention. Therefore, these two arsenates, along with arsenic acid and arsenic pentoxide, are the preferred compounds for the practice of my invention. Other pentavalent arsenic compounds, for example the acid sodium salts of arsenic acid and triammonium arsenate, have been found ineffective in the practice of my invention.

For ease of describing the invention in detail, the process will be discussed principally in terms of solutions of arsenic acid. It is to be understood that the discussion applies equally well to solutions of certain other pentavalent arsenic compounds, and particularly to those of arsenic pentoxide, dihydrogen ammonium arsenate, and monohydrogen ammonium arsenate.

The arsenic acid used in carrying out my invention is readily available commercially as about a 70%–75% solution in water. It may also be prepared by dissolving arsenic pentoxide, $As_2O_5$, in water. Further, arsenic trioxide may be oxidized with nitric acid in aqueous solution to form arsenic acid, a commercial procedure.

In practicing my invention for the leaf desiccation and/or defoliation of cotton plants, a water solution of arsenic acid is sprayed on the nearly mature and mature cotton plants by means of ground spraying or by airborne spraying equipment. For ground spraying, for example, by means of motorized field equipment, the solutions used contain arsenic acid, $H_3AsO_4$, or its equivalent in acidic pentavalent arsenic compound, in amounts of from about 1.5% to about 8.0% by weight of solution. For spraying by means of airborne equipment, the solutions used contain from about 3.5% to about 20% by weight of solution of $H_3AsO_4$ or its equivalent as defined above. The rate of application is from about 1.5 pounds to about 6 pounds of $H_3AsO_4$ or its equivalent per acre of cotton plants.

The concentration of $H_3AsO_4$ in the spray solution as well as the total amount of $H_3AsO_4$ applied per acre of plants should be kept within the above limits. The spray solution of this invention is unique in that both its concentration of active ingredient, $H_3AsO_4$, as well as the amount of active ingredient dispersed per acre of plants must be kept within the limits set forth herein. Use of a solution containing an excessive amount of $H_3AsO_4$ will cause rapid injury and subsequent wilting of treated plants without satisfactory leaf desiccation and plant defoliation. Conversely, use of too little $H_3AsO_4$ in the spray solution is inefficient since several applications would need to be made in order to deposit enough $H_3AsO_4$ to obtain satisfactory desiccation and defoliation of the leaves of the treated plants. Application of an excessive amount of $H_3AsO_4$ per acre of plants must be avoided also in order to obtain maximal defoliant and desiccation efficiency without injury to the crop and to keep arsenic content of the soil below toxic sterilization limits. A preferred amount for this purpose is about 3 pounds per acre. An upper limit of about 6 pounds of $H_3AsO_4$ per acre of plants has been found desirable.

The solutions used in practicing my invention are readily prepared by dissolving the selected pentavalent arsenic compound in water. When the compound is $H_3AsO_4$ and is obtained as a 75% arsenic acid solution, a successful leaf desiccating and plant defoliating solution adequate for spraying by ground sprayers one acre of cotton plants is prepared by mixing from one pint to two quarts of the 75% acid with eight to twelve gallons of water. The leaf desiccating and plant defoliating solution thus formed will contain an equivalent of from about 0.1 to about 0.75 pound of $H_3AsO_4$ per gallon of field solution, or about 1.5% to about 8% by weight.

Similarly, for spraying one acre of cotton plants by airplane sprayers, a solution of $H_3AsO_4$ is prepared by mixing from one pint to two quarts of 75% $H_3AsO_4$ with three to five gallons of water. The solution then will contain an equivalent of from 0.3 to 2 pounds of $H_3AsO_4$ per gallon of field strength solution, or about 3.5% to 20% by weight.

When a selected pentavalent arsenic compound other than arsenic acid is used, it may be substituted in molar equivalent quantities for the arsenic acid. In terms of pounds, one pound of arsenic acid is thus equivalent to 0.81 pound of arsenic pentoxide, or 1.1 pounds of dihydrogen ammonium arsenate or 1.23 pounds of monohydrogen ammonium arsenate.

Customary formulating techniques may be used in preparing the pentavalent arsenic compound containing solution to make it more efficient in covering and penetrating the foliage of the plant to which it is applied. For example, a small amount of surface active agent, up to about 2% by weight of solution, may be added to an aqueous solution of the arsenic compound to increase its wetting and spreading ability on the leaves on which it is sprayed. Examples of suitable surface active agents include the alkyl aryl sulfonates, the polyglycol ethers, the alkyl sulfates and the sulfosuccinic esters. A typical agent is Santomerse D (Monsanto Chemical Company), a sulfonated keryl benzene in which the keryl group has an average molecular weight equivalent to a decyl group. Other compounds which may be incorporated into the spray solution include stickers, such as finely divided resinous materials, and thickeners, such as polyvinyl alcohol or polyacrylic acid.

The addition to the field strength solution of about 0.5% to about 12% by weight of solution of a humectant, particularly sorbitol, is also advantageous. Presence of sorbitol in the solution has been found to noticeably increase the defoliation power of the composition. When 75% arsenic acid is used with the sorbitol, the acid and sorbitol are preferably premixed in the ratio of from about 0.5 to 1.5 lbs. of sorbitol per pint of acid. This mixture can then be added to a fixed volume of water to make up the field strength solution.

The pentavalent arsenic compound, preferably $As_2O_5$, along with wetting agents, humectants, and stickers, can also be impregnated into an absorbent dust, such as fuller's earth, and diluted with a carrier dust, such as clay or bentonite. The dust blend preferably should have a particle size such that at least 90% of the particles pass through a 200 mesh Tyler Standard sieve. A particle size finer than 200 mesh is especially preferred. The dust blend is applied to the cotton plants by the usual types of dusting equipment. A blend containing about 3% by weight of $As_2O_5$ is preferred, but blends containing 1 to 10% by weight may be readily used under suitable dispersing conditions. Application is preferably made at a rate equivalent to about three pounds of $H_3AsO_4$ per acre of plants, but, as in the solution application, may range from about 1.5 pounds to about 6 pounds of $H_3AsO_4$ per acre.

Spraying and dusting is best done with airborne equipment, from the standpoint of efficiency. However, other forms of spraying equipment may be used if the usual precautions well known in the spraying art for handling poisonous materials are taken. Equipment should be thoroughly cleaned before use to remove alkali and other chemicals which could react with the arsenic acid to reduce its desiccating and defoliating activity. After use, the equipment should be cleaned to remove traces of arsenic which might contaminate other sprays used from the same equipment. Spraying is preferably done under favorable conditions of sunlight, moisture, humidity and other factors. However, these factors have been found to be less critical in the successful practice of my invention than when other defoliating agents are used.

The following examples illustrate the practice of my invention.

*Example 1*

Four gallons of 70% arsenic acid (10.4 pounds $H_3AsO_4$ per gallon, 100% basis) were mixed with about 120 gallons of water, making a water solution containing the equivalent of about one-third pound of $H_3AsO_4$ per gallon. The solution was sprayed in mid-August over twelve acres of nearly mature and mature cotton plants in Burleson County, Texas, using a conventional airplane sprayer. Application amounted to about 3.5 pounds of $H_3AsO_4$ per acre. The next day after application the leaves of the cotton plants began drying. At the end of 5 days desiccation of the leaves was well advanced, and about 50% of the leaves had fallen.

The mature cotton bolls continued to open until the crop was harvested, about 10 days after the spraying. The quality of the seed cotton was not lowered, as would have been the case had herbicidal amounts of $H_3AsO_4$ been used.

*Example 2*

Thirty gallons of 70% arsenic acid were mixed with about 900 gallons of water. The arsenic acid solution thus prepared was sprayed in mid-August from an airplane over 90 acres of nearly mature or mature cotton plants near Rogers, Texas. Drying of the leaves of the cotton plants was observed the following day. At the end of five days, about 50% of the leaves had fallen. The cotton was readily harvested by mechanical means. Chemical analysis of the cotton fiber and seed showed no residual arsenic present on the lint. No damage to the seed cotton was found.

*Example 3*

One pint of 75% arsenic acid, equivalent to about 1.5 pounds of $H_3AsO_4$ (100% weight basis) is dissolved in about 12 gallons of water to make a solution containing the equivalent of about 0.1 pound of $H_3AsO_4$ per gallon of field solution. The solution is sprayed by means of a ground sprayer on mature and nearly mature cotton plants in an amount equivalent to about 1.5 pounds of $H_3AsO_4$ per acre. Desiccation and defoliation results were comparable to those obtained in the case of Example 2.

*Example 4*

One pint of 75% arsenic acid, equivalent to about 1.5 pounds of $H_3AsO_4$, 100% weight basis, is dissolved in about eight gallons of water to make a solution containing the equivalent of about 0.2 pound of $H_3AsO_4$ per gallon of field solution. The solution is sprayed by means of a ground sprayer on mature and nearly mature cotton plants in an amount equivalent to about 1.5 pounds of $H_3AsO_4$ per acre. Desiccation and defoliation results were similar to those obtained in Example 2.

Other field strength solutions of $H_3AsO_4$ can be prepared from 75% $H_3AsO_4$ by diluting the acid with water as shown in the following examples.

| Example | Application rate, Lbs. $H_3AsO_4$/Acre, 100% basis | Composition | | | Field Strength Solution | |
|---|---|---|---|---|---|---|
| | | Approx. Gals. Water | Pints 75% $H_3AsO_4$ | Lbs. Sorbitol | Application Rate, Gals./acre | Approx. Percent $H_3AsO_4$/wgt. |
| 5 | 1.5 | 3 | 1 | 0.5 | 3 | 6.0 |
| 6 | 1.5 | 5 | 1 | 1.0 | 5 | 3.6 |
| 7 | 3.0 | 3 | 2 | 1.5 | 3 | 12.0 |
| 8 | 3.0 | 5 | 2 | 2.0 | 5 | 7.2 |
| 9 | 3.0 | 8 | 2 | 2.5 | 8 | 4.5 |
| 10 | 3.0 | 12 | 2 | 3.0 | 12 | 3.0 |
| 11 | 6.0 | 3 | 4 | 3.0 | 3 | 18.0 |
| 12 | 6.0 | 5 | 4 | 4.0 | 5 | 14.4 |
| 13 | 6.0 | 8 | 4 | 5.0 | 8 | 9.0 |
| 14 | 6.0 | 12 | 4 | 6.0 | 12 | 6.0 |

*Example 15*

One quart of 75% arsenic acid, equivalent to about three pounds of $H_3AsO_4$, 100% weight basis, is dissolved in about five gallons of water. To this mixture are added 2.5 pounds of sorbitol and 1.25 pounds of Santomerse D. The solution is sprayed from an airplane on mature and nearly mature cotton plants at least two days before harvesting in an amount equivalent to about three pounds of $H_3AsO_4$ per acre. The degree of defoliation of the plant is greater than when no sorbitol is used.

*Example 16*

Two pounds of arsenic pentoxide are dissolved in about ten gallons of water along with 3 pounds of sorbitol and 1.5 pounds of Santomerse D. The solution is sprayed on mature or nearly mature cotton plants at least two days before harvesting in an amount equivalent to about 2 pounds of $As_2O_5$ or about 2.5 pounds of $H_3AsO_4$ per acre.

*Example 17*

Three pounds of $As_2O_5$ and 0.5 pound of a wetting agent are milled with 96.5 pounds of kaolin clay to a particle size of 90% through 200 mesh or finer. The dust blend is applied to mature or nearly mature cotton plants at least two days before harvesting in an amount equivalent to about three pounds of $H_3AsO_4$ per acre. Desiccation and defoliation were satisfactory for mechanical harvesting.

*Example 18*

Thirty-three pounds of $NH_4H_2AsO_4$ are mixed with 15 pounds of sorbitol and 8 pounds of Santomerse D in sufficient water to make 100 gallons of field strength solution for spraying with airborne spraying equipment. This solution is equivalent to about 3.5% of $H_3AsO_4$ by weight of solution. The solution is sprayed on cotton plants at about ten days before harvesting at the rate of about five gallons of solution per acre. The amount of $$NH_4H_2AsO_4$$

thus deposited is about 1.7 pounds per acre. Desiccation of the leaves of the cotton plants begins almost immediately and is well completed by the time harvesting is to commence. Defoliation of about 40% or more of the leaves occurs within about the first week after spraying and continues into the harvesting period.

*Example 19*

Thirty pounds of $(NH_4)_2HAsO_4$ are mixed with 15 pounds of sorbitol and 8 pounds of Santomerse D in sufficient water to make 100 gallons of field strength solution for spraying with motorized ground spraying equipment. This solution is equivalent to about 2.8% of $H_3AsO_4$ by weight of solution. The solution is sprayed on cotton plants at about five days before harvesting at the rate of about 12 gallons of solution per acre of plants, leaving a deposit of about 3.7 pounds of $(NH_4)_2HAsO_4$ per acre. Desiccation of the leaves begins almost immediately, with defoliation of more than half the leaves occurring by the time harvesting is to begin.

Many different embodiments of this invention may be made without departing from the scope and spirit of it and it is to be understood that my invention includes all such embodiments and is not to be limited by the above description.

I claim:

1. The method for harvesting cotton which comprises applying to the foliage of mature and nearly mature cotton plants before harvesting a composition consisting essentially of from about 1.5% to about 20% by weight of a water-soluble pentavalent arsenic compound selected from the group consisting of arsenic acid, arsenic pentoxide, dihydrogen ammonium arsenate and monohydrogen ammonium arsenate in an amount equivalent to from about 1.5 to about 6 pounds of arsenic acid per acre of plants, allowing the treated plants to desiccate for from at least two days to about two weeks before harvesting, and then stripping the cotton from said treated plants by mechanical means.

2. The method according to claim 1 in which the pentavalent arsenic compound is arsenic acid.

3. The method according to claim 1 in which the pentavalent arsenic compound is arsenic pentoxide.

4. The method according to claim 1 in which the pentavalent arsenic compound is dihydrogen ammonium arsenate.

5. The method according to claim 1 in which the pentavalent arsenic compound is monohydrogen ammonium arsenate.

6. The method for preparing mature and nearly mature cotton plants for harvesting by mechanical cotton stripping means which comprises applying to the foliage of said plants for desiccation and defoliation purposes a composition consisting essentially of from about 1.5% to about 20% by weight of a water-soluble pentavalent arsenic compound selected from the group consisting of arsenic acid, arsenic pentoxide, dihydrogen ammonium arsenate and monohydrogen ammonium arsenate in an amount equivalent to from about 1.5 to about 6 pounds of arsenic acid per acre of plants at least two days before harvesting.

7. The method for preparing mature and nearly mature cotton plants for harvesting by mechanical cotton stripping means which comprises applying to the foliage of said plants for desiccation and defoliation purposes a composition consisting essentially of an aqueous solution containing from about 1.5% to about 20% by weight of a water-soluble pentavalent arsenic compound selected from the group consisting of arsenic acid, arsenic pentoxide, dihydrogen ammonium arsenate and monohydrogen ammonium arsenate in an amount equivalent to from about 1.5 to about 6 pounds of arsenic acid per acre of plants at least two days before harvesting.

8. The method for preparing mature and nearly mature cotton plants for harvesting by mechanical cotton stripping means which comprises applying to the foliage of said plants for desiccation and defoliation purposes a composition consisting essentially of from about 1.5% to about 20% by weight of a water-soluble pentavalent arsenic compound selected from the group consisting of arsenic acid, arsenic pentoxide, dihydrogen ammonium arsenate and monohydrogen ammonium arsenate with an agricultural carrier and a wetting agent at an amount equivalent to from about 1.5 to about 6 pounds of arsenic acid per acre of plants at least two days before harvesting.

9. The method according to claim 6 in which the pentavalent arsenic compound is arsenic acid.

10. The method according to claim 6 in which the pentavalent arsenic compound is arsenic pentoxide.

11. The method according to claim 6 in which the pentavalent arsenic compound is dihydrogen ammonium arsenate.

12. The method according to claim 6 in which the pentavalent arsenic compound is monohydrogen ammonium arsenate.

References Cited in the file of this patent

UNITED STATES PATENTS

| | | |
|---|---|---|
| 142,985 | Bibb | Sept. 23, 1873 |
| 1,173,019 | Orton | Feb. 22, 1916 |
| 2,370,349 | Hance | Feb. 27, 1945 |
| 2,391,299 | De Laney | Dec. 18, 1947 |
| 2,723,193 | Todd | Nov. 9, 1955 |
| 2,760,854 | La Lande | Aug. 28, 1956 |

OTHER REFERENCES

Lovett et al. in "Jr. of Agri. Research," vol. 10, 1917, pages 199 to 207, U.S. Dept. of Agri. Copy in P.O. Library.

Swingle et al.: "Jr. of Agricultural Research," U.S. Dept. of Agri., vol. 24, 1923, pages 501–537.

Mason: "Spray, Dusting, and Fumigating of Plants," pages 488–493, copyright 1928.

Zwolfer in "Chemical Abstracts," vol. 26, 1932, page 244.